Figures 1, 2:
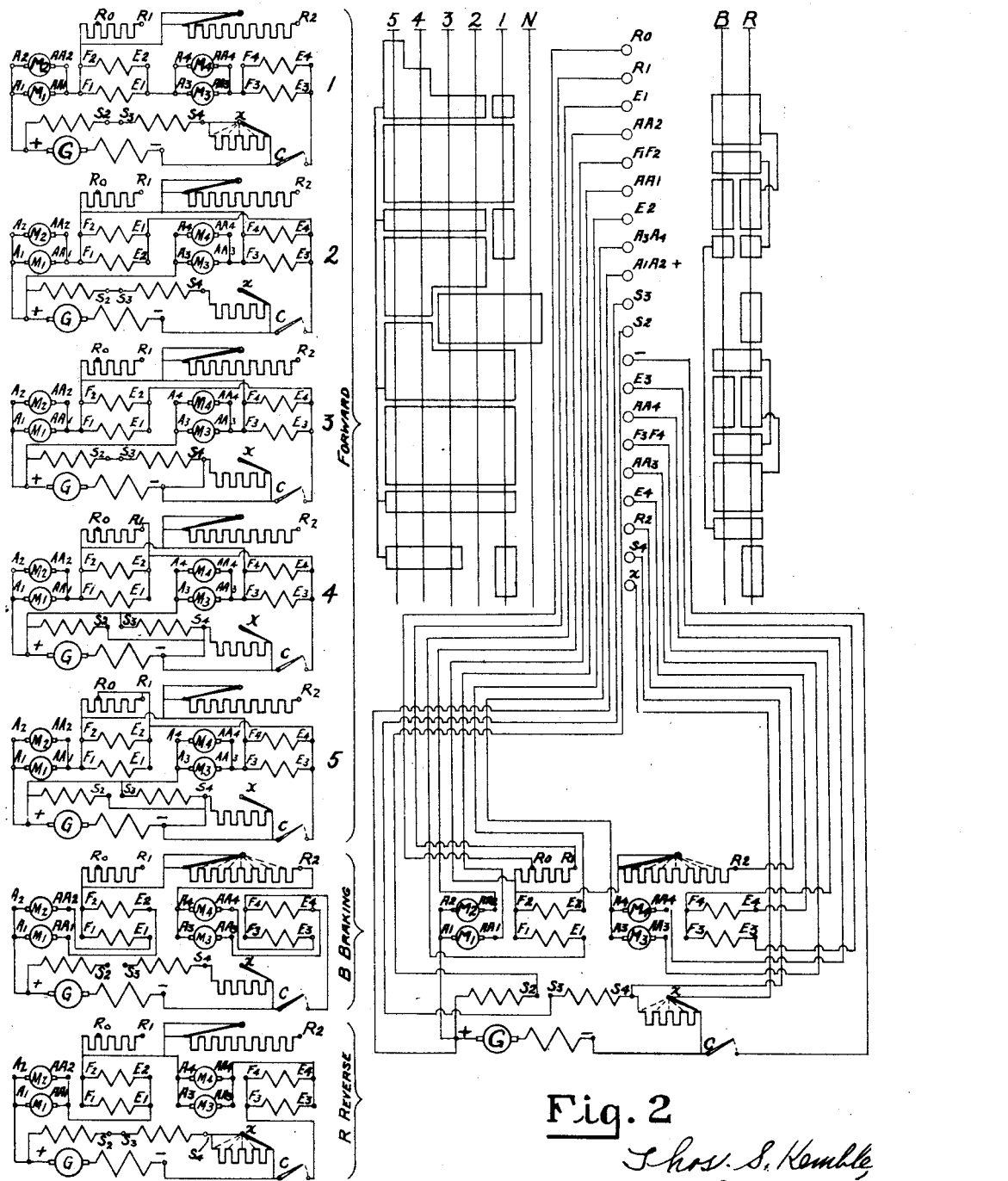

Aug. 13, 1929.  T. S. KEMBLE  1,724,602
ELECTRIC CONTROL FOR ELECTRICALLY DRIVEN VEHICLES
Filed July 2, 1924

Thos. S. Kemble,
Inventor

By Attorneys Dodson & Roe

Patented Aug. 13, 1929.

1,724,602

UNITED STATES PATENT OFFICE.

THOMAS S. KEMBLE, OF CLEVELAND, OHIO, ASSIGNOR, BY MESNE ASSIGNMENTS, TO UNIVERSAL GAS ELECTRIC COMPANY, OF LAWRENCE, KANSAS, A CORPORATION OF DELAWARE.

ELECTRIC CONTROL FOR ELECTRICALLY-DRIVEN VEHICLES.

Application filed July 2, 1924. Serial No. 723,771.

Various combinations have been used to enable the internal-combustion engine with its peculiar characteristics to provide variable speed and tractive effort in a vehicle through the aid of electric transmission without change of gear ratio. Some of these have endeavored to provide constant engine speed with variable throttle opening, some have provided batteries floating on the line and some have been of the hit and miss variety.

All of these have to contend with a handicap in the form of power loss in generator, electric conductors and in motors. It is customary in devices of this character to provide a controller, with a handle by which the controller is connected to electrical connections, so as to alter the different connections as the handle is swung through a segment of the circle. In order to hold the handle in position to maintain a certain set of connections when made, it is customary to provide a notch, or a series of notches, in the metal adjacent the controller handle, in which the handle is held by spring pressure, or other means. These notches are universally referred to in the trade, as controller notches, forward or reverse, as the case may be. Connection of motors in series on the first controller notch tends to provide high starting tractive effort without excessive generator current, but vehicle speed is very limited even with engine running wild. Connection of motors in parallel on succeeding controller notch permits higher vehicle speed with normal engine speed. If engine and electrical units are large enough a considerable range of tractive effort and speed can be obtained in this manner, but the average engine efficiency is low because under average conditions it runs very much throttled.

It has been attempted to remedy this condition by using storage batteries with a small engine. In this case the batteries assist the engine when more power is required than it can develop and the engine recharges the batteries when less power is required than it can develop. The engine operation is rendered more efficient, but there are additional power losses involved in charging and discharging the batteries, and there is added the initial cost and upkeep of the batteries and the cost of transporting the additional weight in the vehicle.

I have developed a new solution from an entirely different angle and provide so wide a range in the ratio of generator torque to motor torque that the engine can operate at practically wide open throttle whenever power is required, it can be operated at practically full speed whenever maximum power is required regardless of the vehicle speed, and it can be pulled down by the generator torque, to the speed at which it can develop no more than the required power whenever the required power is less and regardless of the vehicle speed.

The engine therefore operates at approximately maximum efficiency all the time, and it need be only so large as is required to furnish the maximum power required for operation of the vehicle. We are able by this means, in ordinary service, to regain by engine efficiency all that is lost in electrical transmission.

My arrangement further enables us to overspeed the series motors at maximum vehicle speed which fact renders possible higher gear ratio between motor and wheel for given speed and torque specifications. By this means I can use smaller motors to obtain the maximum tractive effort required and I save in cost and weight of the motors.

Resistance in series with the generator shunt fields is needed when motors are in series only under conditions where excessive tractive effort is required such as in climbing a steep unpaved grade or in travelling through deep sticky mud. For this reason, the resistance is placed in the line in the form of a variable rheostat operated by a separate lever which we call a "booster" lever. It can be controlled by main controller. The resistance is normally short circuited (on notch with motors in series) and comes into play only when the "booster" lever is operated. The "booster" lever is provided with a spring return so that it returns to normal when operator lets go of it, or is interlocked with main controller.

In the second notch, the same resistance is thrown into the circuit by the main controller independent of the "booster" lever to reduce the otherwise excessive step between series and parallel motor operation.

Resistance in parallel with motor fields on fourth and fifth notches forward, is shown as being varied by operation of the main controller. With this arrangement, each additional variation requires an additional brush and controller notch. Ordinarily, however, I believe that four notches ahead will be sufficient for city work and for interurban travel with long level stretches of paved road and little traffic, another brush and an additional notch may be added to the main controller as shown in wiring diagram (reducing the resistance), but if further variations are desired, they may be added, as indicated, or the resistance variations may all be obtained through a separate lever, similar to the booster lever previously mentioned.

My means for accomplishing the foregoing may be more readily understood by having reference to the accompanying drawings which are annexed and which are a part of this specification, in which, Fig. 1 shows the connections as obtained through the main controller for 1 first controller notch, 2 second, 3 third, 4 fourth, 5 fifth notch forward driving of the vehicle, and for B braking notch and R reverse notch;

Fig. 2 shows main controller diagram with connections to resistance, controllers, and operating units.

As shown in the drawings, $M^1$, $M^2$, $M^3$ and $M^4$ are motor armatures with their leads ($A^1$, $AA^1$), ($A^2$, $AA^2$), ($A^3$, $AA^3$), ($A^4$, $AA^4$) and their corresponding fields are shown with leads (to outside) ($F^1$, $E^1$), ($F^2$, $E^2$), ($F^3$, $E^3$), ($F^4$, $E^4$). G is a compound wound generator with its leads "plus" and "minus" and with three leads from the shunt fields (brought outside) $S^2$, $S^3$ and $S^4$. All other generator connections are internal.

$R^0$ and $R^1$ are leads from a resistance which is at certain times arranged in parallel with the fields of the series motors. $R^2$ is a lead from a resistance which is at certain times arranged in series with the main circuit to absorb and dissipate the energy developed in electric braking. This resistance is variable to regulate the braking intensity and this variation is obtained through a separate controller, preferably operated by the same controller lever which operates the main controller.

X is a lead from a resistance which is at certain times arranged in series with the shunt fields of the generator. It is shown to be thrown in by the main controller in the second notch and it is shown as being thrown in by a separate lever in gradual steps in the first notch and in the reversing notch.

As shown in the diagram, the operation will be as follows:

Assuming the handle of the controller has been shifted until it rests in the first notch forward, connection 1, as shown in Fig. 2, is established, so that the motor armatures $M^1$ and $M^2$ are in parallel with each other, while the motor fields $F^1$ $E^1$ and $F^2$ $E^2$ are in parallel with each other. The above armatures are connected in series with the above fields.

The motor armatures $M^3$ and $M^4$ are in parallel with each other, while the motor fields $F^3$ $E^3$ and $F^4$ $E^4$ are parallel with each other.

The above armatures are connected in series with the above fields.

The above pairs of motors are connected with each pair in series with the other pair.

The generator shunt fields are connected in series with each other and connected to the lead X of a resistance in such a manner that operation of the "booster" lever referred to elsewhere may cut the resistance into series by successive steps.

The resistances $R^0$ $R^1$ and $R^2$ are open.

When the handle of the controller is shifted into the second notch forward, connection 2, is established, and all four motors are thrown in parallel.

Lead X is disconnected, throwing its resistance in series with the shunt fields of the generator to reduce the size of the step which would otherwise be involved by throwing the motors from series parallel to parallel operation.

When the controller handle is shifted into the third notch forward, connection 3 as shown in Fig. 2 is established, and $S^4$ is connected to minus G, cutting the resistance at X out of series with generator shunt fields by shorting $S^4$ to minus G.

With the shift of the controller handle into the fourth notch forward, connection 4, as shown in Fig. 2, is established, and the generator shunt fields are connected in parallel and lead $R^1$ connected to $E^1$, $E^2$, $E^3$ and $E^4$ putting resistance in parallel with motor fields.

The shifting of the controller handle into the fifth notch forward establishes connection 5, as shown in Fig. 2, and the lead $R^0$ is connected to $E^1$, $E^2$, $E^3$ and $E^4$, thereby reducing the amount of resistance in parallel with motor fields.

With the shift of the controller handle into the reverse notch, the position indicated at R in Fig. 2, the connection established is the same as the first notch forward but with the motor fields reversed.

When the handle of the controller is shifted into the braking notch, the position indicated at B in Fig. 2, the connection established is the same as the second notch forward, but with the generator shunt fields open and with the two pairs of motors connected in series, each pair with the other, and with the resistance $R^2$ connected in series between them, and with each pair of motors interconnected so that each motor armature is in series with the field of its mate and with the fields reversed. Thus, $AA^1$ is connected to $E^2$ and $AA^2$ is connected to $E^1$. Also $AA^3$ is connected to $E^4$ and $AA^4$ is connected to $E^3$.

Having thus described my invention what I regard as new and desire to secure by Letters Patent of the United States, is:

Claims:

1. The combination with a vehicle and an internal combustion engine, of an electrical generator having two shunt field windings driven thereby, two pairs of electric motors, each motor having an armature and a field winding, electric conductors to convey current from said generator to said motors, a controller, said controller having a plurality of notches and conducting elements, so arranged that the controller will affect said conductors and in the first notch forward will establish parallel connections between the armatures of each pair of motors, series connections between the armatures and fields of each pair of motors, series connections between the two pairs of motors, and series connections between the shunt field windings of the generator.

2. The combination with a vehicle and an internal combustion engine, of an electrical generator driven thereby, shunt fields for said generator, two pairs of electric motors, electric conductors to convey current from the generator to each pair of said motors, a controller, said controller having a plurality of notches, a resistance element, and conducting elements so arranged that the controller will affect said conductors and in the second notch forward will establish parallel connections between both pairs of motors, and series connections between the resistance element and the generator shunt fields.

3. The combination with a vehicle and an internal combustion engine, of an electrical generator driven thereby, shunt fields for said generators, two pairs of electric motors, electric conductors to convey current from the generator to each pair of said motors, a controller, said controller having a plurality of notches, a resistance element established in series with said shunt fields of said generator in another notch, and conducting elements so arranged that the controller will affect said conductors and in the third notch forward will establish a short circuiting connection around said resistance element.

4. The combination with a vehicle and an internal combustion engine, of an electrical generator driven thereby, two shunt field windings for said generator, two pairs of electric motors, each motor having a series field winding, electric conductors to convey current from the generator to each pair of said motors, a controller, said controller having a plurality of notches, a resistance element, and conducting elements so arranged that the controller will affect said conductors and in the fourth notch forward will establish parallel connections between said shunt field windings and will establish parallel connections between said resistance element and said series field windings of said electric motors.

5. The combination with a vehicle and an internal combustion engine, of an electrical generator driven thereby, two pairs of electric motors, each motor having a series field winding, a controller, said controller having a plurality of notches, a resistance element paralleled with said series field windings of said motors in another notch, and conducting elements so arranged that the controller will affect said conducting elements and in the fifth notch forward will establish a short circuiting connection around part of said resistance element.

6. The combination with a vehicle and an internal combustion engine, of an electrical generator having two shunt field windings driven thereby, two pairs of electric motors, each motor having an armature and a series field winding, electric conductors to convey current from the generator to said motors, a controller, said controller having a plurality of notches, and conducting elements so arranged that the controller will affect said conductors and in the reverse notch will establish parallel connections between the armatures of each pair of motors and will establish parallel connections between the fields of each pair of motors, series connections between the armatures and fields of each pair of motors, series connections between the two pairs of motors, and series connections between the shunt field windings of the generator.

7. The combination with a vehicle and an internal combustion engine, of an electrical generator having two shunt field windings driven thereby, two pairs of electric motors, each motor having an armature and a series field winding, a resistance element, electric conductors to convey current from the generator to said motors, a controller, series connections between the said field windings established by said controller, said controller having a plurality of notches, and conducting elements, so arranged that the controller will affect said conductors and in the braking notch will establish series connections between the armature of each motor and the field of the motor with which it is paired, parallel connections between said series connections and series connections between said parallel connections and said resistance element, and will open the series connections between the shunt field windings of the generator.

8. The combination with a vehicle and a prime mover, of an electrical generator driven by said prime mover, said generator having two shunt field windings, a resistance element, two pairs of electric motors, a series field for each motor, electric conductors to convey current from said generator to said motors, a controller, said controller having a plurality of notches, and conducting elements, so arranged that the controller will affect said conductors and in the first notch forward will establish parallel connections between the motors of each pair, series connections between the pairs of motors, and series connections between the shunt field windings of the generator and in the second notch forward will establish parallel connections between both pairs of motors and series connections between the shunt field windings of the generator and the resistance element and in the third notch forward will establish a short circuiting connection around said resistance element.

9. The combination with a vehicle and a prime mover, of an electrical generator driven by said prime mover, said generator having two shunt field windings, a resistance element, a second resistance element, two pairs of electric motors, a series field for each motor, electric conductors to convey current from said generator to said motors, a controller, said controller having a plurality of notches, and conducting elements so arranged that the controller will affect said conductors and in a forward notch will establish parallel connections between both pairs of motors and series connections between the shunt field windings of the generator and the first mentioned resistance element, and in a second forward notch adjacent said first mentioned forward notch will establish a short circuiting connection around said first mentioned resistance element, and in a third forward notch adjacent said second mentioned forward notch will establish parallel connections between said shunt field windings and will establish parallel connections between said second mentioned resistance element and the series field windings of said motors.

THOS. S. KEMBLE.